United States Patent
Yang et al.

(10) Patent No.: US 10,197,416 B2
(45) Date of Patent: Feb. 5, 2019

(54) MULTIPLE AXIS WRIST WORN PEDOMETER

(71) Applicant: QuickLogic Corporation, Sunnyvale, CA (US)

(72) Inventors: Duanduan Yang, Sunnyvale, CA (US); Dong An, Cupertino, CA (US); Ying Wu, San Jose, CA (US)

(73) Assignee: QuickLogic Corporation, Sunnyvale, CA (US)

( * ) Notice: Subject to any disclaimer, the term of this patent is extended or adjusted under 35 U.S.C. 154(b) by 514 days.

(21) Appl. No.: 14/602,188

(22) Filed: Jan. 21, 2015

(65) Prior Publication Data

US 2016/0209232 A1 Jul. 21, 2016

(51) Int. Cl.
  *G01C 22/00* (2006.01)
  *G01C 21/12* (2006.01)

(52) U.S. Cl.
  CPC .......... *G01C 22/006* (2013.01); *G01C 21/12* (2013.01)

(58) Field of Classification Search
  CPC ....... G01C 22/00; G06F 3/011; A61B 5/6803; A61B 5/4566; A61B 5/1121; A61B 5/6822; A61B 5/6814; A61B 5/1116; A61B 2562/0219; A61B 2505/09; A61B 5/6831; A63B 23/025; A63B 23/0244
  USPC ........ 702/141, 150, 160; 600/500, 301, 309, 600/310, 324
  See application file for complete search history.

(56) References Cited

U.S. PATENT DOCUMENTS

| | | | |
|---|---|---|---|
| 3,717,864 A * | 2/1973 | Cook | G08B 13/1663 340/566 |
| 6,700,499 B2 | 3/2004 | Kubo et al. | |
| 7,305,323 B2 | 12/2007 | Skvortsov et al. | |
| 7,334,472 B2 * | 2/2008 | Seo | A61B 5/222 73/379.01 |
| 7,463,997 B2 | 12/2008 | Pasolini et al. | |
| 7,640,134 B2 | 12/2009 | Park et al. | |
| 7,983,872 B2 * | 7/2011 | Makino | A61B 5/1123 702/141 |
| 7,993,276 B2 * | 8/2011 | Nazarian | A61B 5/02438 600/301 |

(Continued)

FOREIGN PATENT DOCUMENTS

JP  2007307218 A * 11/2007 ........... G01C 22/006

*Primary Examiner* — Alexander Satanovsky
*Assistant Examiner* — Lina M Cordero
(74) *Attorney, Agent, or Firm* — Silicon Valley Patent Group LLP

(57) ABSTRACT

A wrist worn pedometer includes a multiple axis inertial sensor. Signals from each axis of the multiple axis inertial sensor are received and are separately analyzed to determine which axis is producing a stable periodic signal, which is selected as the counting axis, i.e., the axis to be used for counting steps. Additionally, the pedometer determines whether the counting axis is registering arm movement or footsteps. The user's steps are counted based on the detected events, e.g., detected peaks or intervals between peaks, on the signal from the counting axis. One step per detected event is counted if the counting axis is registering footsteps and two steps per detected event are counted if the counting axis is registering arm movement. If the stability of the selected counting axis is lost, another axis is selected as the counting axis if it is producing a stable periodic signal.

18 Claims, 6 Drawing Sheets

(56) References Cited

U.S. PATENT DOCUMENTS

| | | | |
|---|---|---|---|
| 8,311,768 B2* | 11/2012 | Fukutome | G01C 22/006 377/20 |
| 8,858,454 B2* | 10/2014 | Nazarian | A61B 5/02438 600/309 |
| 9,311,789 B1* | 4/2016 | Gwin | G08C 19/00 |
| 9,314,666 B2* | 4/2016 | Canavan | A63B 24/0062 |
| 2002/0089425 A1* | 7/2002 | Kubo | G01C 22/006 340/573.1 |
| 2006/0020177 A1* | 1/2006 | Seo | A61B 5/222 600/300 |
| 2006/0084879 A1* | 4/2006 | Nazarian | A61B 5/02438 600/500 |
| 2007/0123787 A1* | 5/2007 | Kitajima | A61B 5/02416 600/509 |
| 2007/0202997 A1 | 8/2007 | Tsubata | |
| 2008/0275669 A1 | 11/2008 | Ihashi et al. | |
| 2010/0292618 A1* | 11/2010 | Okuya | A61B 5/1038 600/595 |
| 2012/0004519 A1* | 1/2012 | Nazarian | A61B 5/02438 600/301 |
| 2012/0203503 A1 | 8/2012 | Nakamura | |
| 2012/0291544 A1* | 11/2012 | Kawabe | A61B 5/11 73/488 |
| 2013/0085700 A1 | 4/2013 | Modi et al. | |
| 2013/0173209 A1* | 7/2013 | Shimoda | G01P 15/00 702/141 |
| 2013/0179110 A1 | 7/2013 | Lee | |
| 2013/0191069 A1* | 7/2013 | Ravindran | G01C 22/006 702/160 |
| 2014/0074431 A1* | 3/2014 | Modi | G01C 22/006 702/160 |
| 2014/0270375 A1* | 9/2014 | Canavan | A63B 24/0062 382/103 |
| 2014/0365169 A1* | 12/2014 | Pham | G01C 22/006 702/160 |
| 2015/0153199 A1* | 6/2015 | Yamato | G01C 22/006 702/160 |
| 2016/0198995 A1* | 7/2016 | Yeung | A61B 5/4528 600/595 |
| 2016/0213974 A1* | 7/2016 | Balakrishnan | A61B 5/1123 |

* cited by examiner

MULTIPLE AXIS WRIST WORN PEDOMETER

FIELD OF THE INVENTION

The present invention relates to a pedometer, and more specifically to a multiple axis pedometer that is worn on the user's wrist.

BACKGROUND

Pedometers are well known electronic devices that are held or worn by a user and count the number of steps taken by the user. Typically, modern pedometers use inertial sensors, such as one or more accelerometers, to detect movement of the pedometer. Often, pedometers are worn on the user's torso, e.g., clipped to a belt or lapel or placed in a pocket. When worn by the user on the torso, the major forces to which the inertial sensors are subject are the forces associated with the steps taken by the user. Accordingly, signals received from the inertial sensors may be relatively easily analyzed to detect and count the steps taken by the user. When a pedometer is worn on a user's wrist, however, the inertial sensors experience additional significant forces, e.g., caused by the movement of the user's wrist. Moreover, the orientation of a wrist worn pedometer may vary significantly as the user walks or runs, e.g., when the user bends an elbow. Accordingly, detecting and counting steps when a pedometer is worn on the user's wrist is subject to additional complications relative to a torso worn pedometer.

SUMMARY

A wrist worn pedometer includes a multiple axis inertial sensor. Signals from each axis of the multiple axis inertial sensor are received and are separately analyzed to determine which axis is producing a stable periodic signal, which is selected as the counting axis, i.e., the axis to be used for counting steps. Additionally, the pedometer determines whether the counting axis is registering arm movement or footsteps. The user's steps are counted based on the detected events, e.g., detected peaks or intervals between peaks, on the signal from the counting axis. One step per detected event is counted if the counting axis is registering footsteps and two steps per detected event are counted if the counting axis is registering arm movement. If the stability of the selected counting axis is lost, another axis is selected as the counting axis if it is producing a stable periodic signal.

In one implementation, a method for counting steps with a wrist worn pedometer includes receiving signals from each axis of a multiple axis inertial sensor in the wrist worn pedometer; detecting peaks on each signal from each axis of the multiple axis inertial sensor; calculating intervals between peaks on each signal from each axis of the multiple axis inertial sensor; determining a first axis with a stable periodic signal based on the intervals between peaks; determining whether the first axis with the stable periodic signal registers arm movement or footsteps; and counting one step per detected event when the first axis with the stable periodic signal registers footsteps and two steps per detected event when the first axis with the stable periodic signal registers arm movement.

In one implementation, a pedometer for counting steps that is wrist worn includes a multiple axis inertial sensor that provides signals for each axis; and a processor coupled to the multiple axis inertial sensor, the processor receives the signals from each axis of the multiple axis inertial sensor in the wrist worn pedometer, the processor configured to detect peaks on each signal from each axis of the multiple axis inertial sensor; calculate intervals between peaks on each signal from each axis of the multiple axis inertial sensor; determine a first axis with a stable periodic signal based on the intervals between peaks; determine whether the first axis with the stable periodic signal registers arm movement or footsteps; and count one step per detected event when the first axis with the stable periodic signal registers footsteps and two steps per detected event when the first axis with the stable periodic signal registers arm movement.

DETAILED DESCRIPTION

Figure 1:
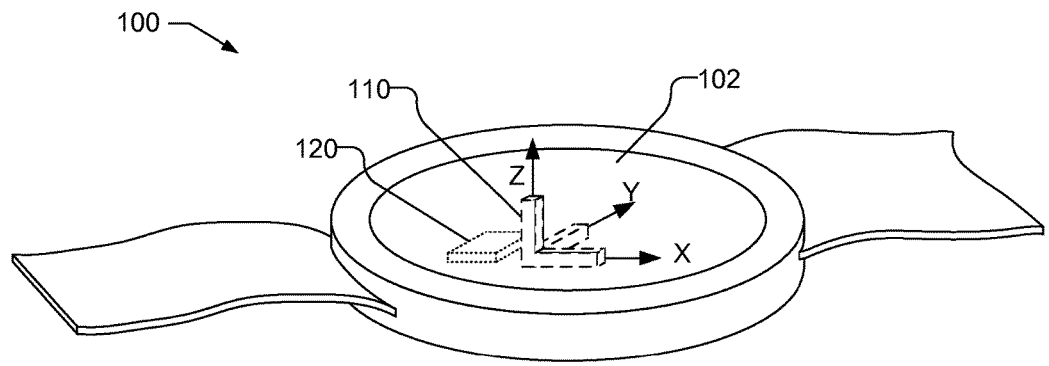
FIG. 1 illustrates a wrist worn pedometer that includes a multiple axis inertial sensor.

FIG. 1 illustrates a wrist worn pedometer 100 that includes a multiple axis inertial sensor 110. Portions of wrist bands are illustrated as extending from the sides of the pedometer 100. The inertial sensor 110 is inside the pedometer 100 and accordingly is illustrated with dotted lines. The multiple axis inertial sensor 110 may be, e.g., a 3 axis accelerometer, where the various axes are labeled X, Y, and Z. The pedometer 100 further includes an internal control unit 120 also illustrated with dotted lines, which may include a processor, memory, etc. The pedometer 100 may further include a user interface 102 that may display information, such as step count, distance traveled, time, etc., to the user, as well as serve as a touch pad for user input. If desired, the pedometer 100 may include hard buttons (not shown) for user input.

Figure 2:
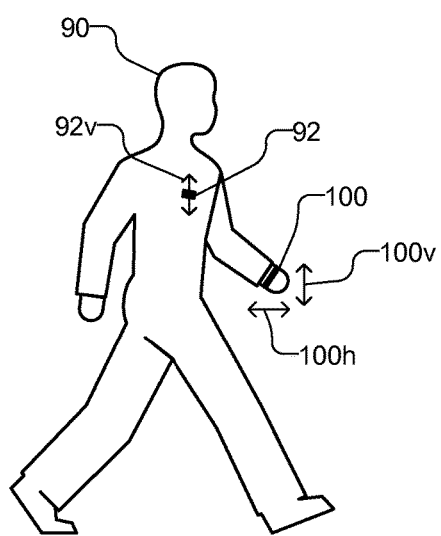
FIG. 2 illustrates a user wearing the pedometer on a wrist as the user is walking.

FIG. 2 illustrates a user 90 wearing the pedometer 100 on a wrist as the user is walking. For purposes of illustration, the user 90 is further shown wearing a pedometer 92 on his torso. The forces detected by pedometer 92 are primarily the vertical forces (illustrated by arrow 92v) associated with the user 100 taking a step. In other words, in addition to the force of gravity and the forces associated with the user's upward and downward movement during each step, the inertial sensors in pedometer 92 detect the impact of the user's foot on the ground. The pedometer 92 is on the user's torso and accordingly will detect the impact of both feet on the ground.

In contrast, wrist worn pedometer 100 moves with the user's arm and accordingly, one axis of the inertial sensor may detect the vertical forces (illustrated by arrow 100v) associated with taking a step, while another axis of the inertial sensor may detect the horizontal forces (illustrated by arrow 100h) associated with the swinging of the user's arm. Additionally, the user may significantly change the orientation of the pedometer 100 simply by bending an elbow, e.g., such as when the user transitions between walking and running, causing the axes of the inertial sensor that detect vertical forces and horizontal forces to change.

Figure 3:
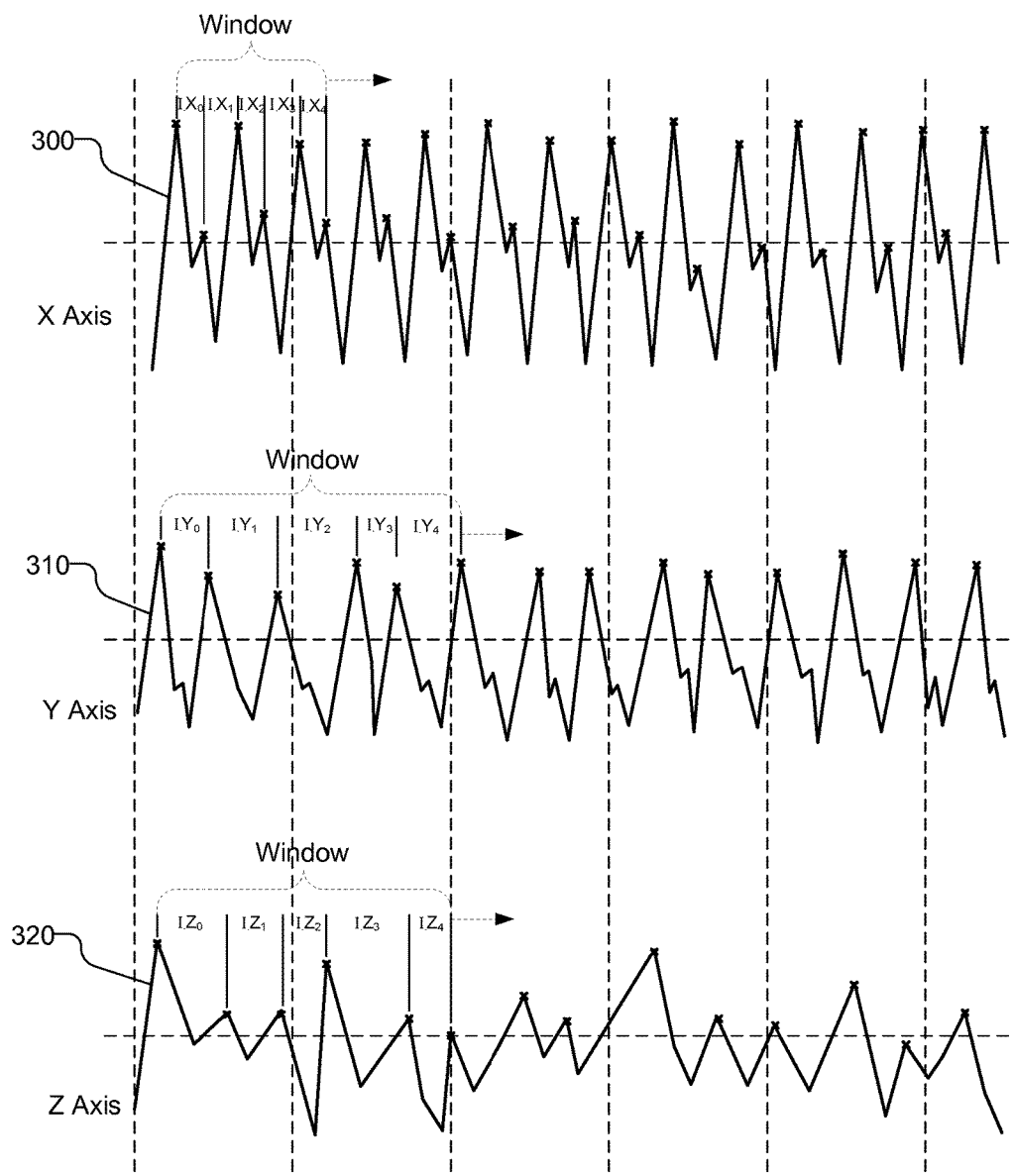
FIG. 3 illustrates three signals produced by the inertial sensor of pedometer over a length of time as the user walks.

FIG. 3, by way of example, illustrates three signals 300, 310 and 320 produced by the inertial sensor 110 of pedometer 100 over a length of time as the user 90 walks. The signals 300, 310, and 320 are illustrated as being produced by the X axis, Y axis, and Z axis, respectively, of the inertial sensor 110 in the pedometer 100. The X axis of the inertial sensor 110, by way of example, is sensitive to the vertical forces associated with taking a step and the Y axis of the inertial sensor 110 is sensitive to the horizontal forces associated with swinging the user's arm upon which the pedometer 100 is worn. The Z axis does not receive horizontal or vertical forces and therefore is illustrated as generating signal 320 with noise.

Walking or running are repeatable body motions, and accordingly, as illustrated in FIG. 3, the signals 300 and 310 from the X axis and Y axis, respectively, are periodic. As can be seen, the periodicity of the signal 310 from the Y axis is twice the periodicity of the signal 300 from the X axis. The differences in periodicity is due to there being one step per period in the signal from the axis that is sensitive to the vertical forces, e.g., signal 300 from the X axis as illustrated in FIG. 3, while there are two steps per period in the signal from the axis that is sensitive to horizontal forces, e.g., signal 310 from the Y axis as illustrated in FIG. 3.

The pedometer 100 separately analyzes the signal from each axis of the inertial sensor 110 to determine which axis is producing a stable periodic signal. The axis producing a stable periodic signal is selected as the counting axis, i.e., the axis to be used for counting steps. Additionally, the pedometer 100 determines whether the counting axis is registering arm movement or footsteps. The user's steps are counted based on the signal from the counting axis, where one step per detected event is used if the counting axis is registering footsteps and two steps per detected event is used if the counting axis is registering arm movement. If the periodicity on the selected counting axis disappears, another axis that is producing a stable periodic signal is selected as the counting axis and it is determined whether the new counting axis is registering arm movement or footsteps. Counting of steps continues using the signal from the new counting axis.

Figure 4:
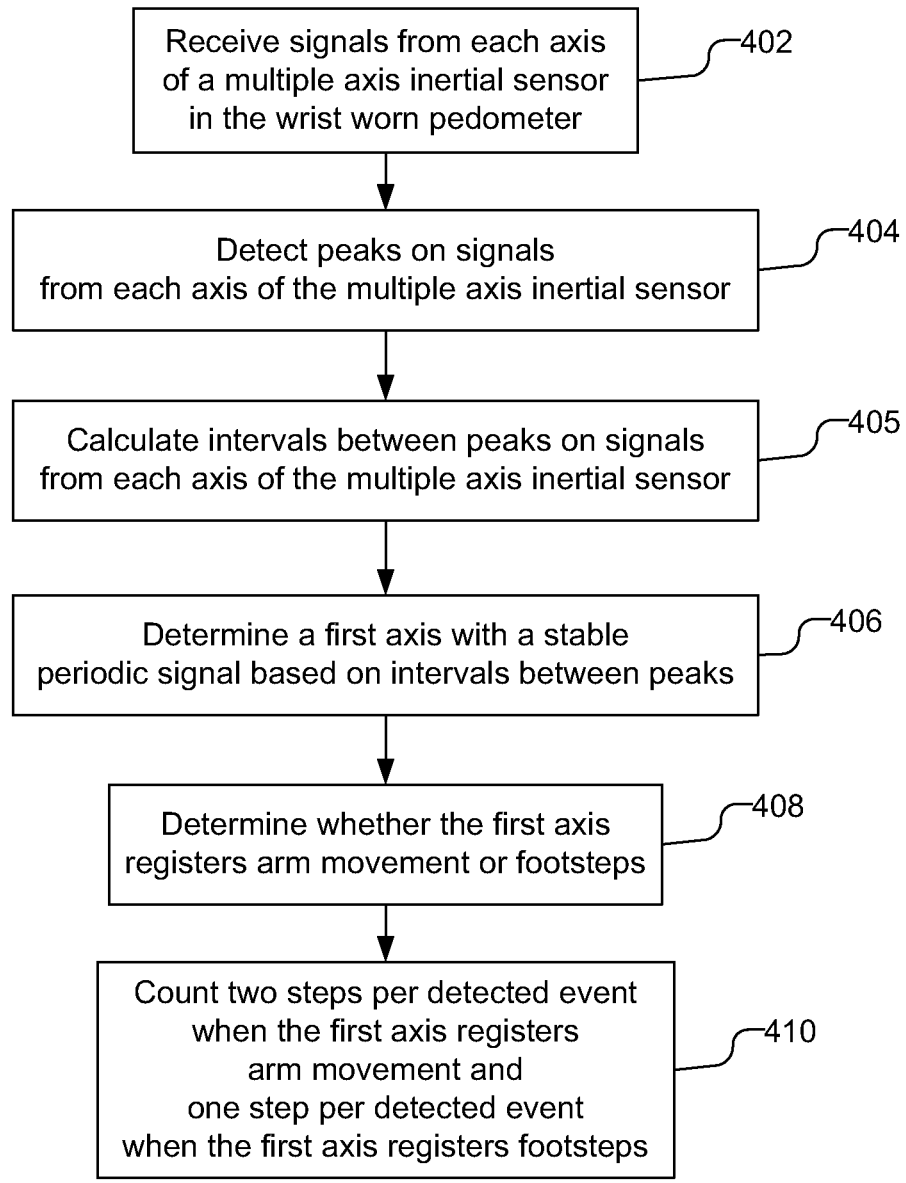
FIG. 4 is a flow chart illustrating a process of counting steps with a wrist worn pedometer that may be employed by pedometer.

FIG. 4 is a flow chart illustrating a process of counting steps with a wrist worn pedometer that may be employed by pedometer 100. As illustrated, signals are received from each axis of a multiple axis inertial sensor in the wrist worn pedometer (402). If desired, the signals may be filtered, e.g., with a moving average filter, or any other desired filter to smooth the signals. Peaks are detected on the signals from each axis of the multiple axis inertial sensor (404). Detecting peaks in signals is well known in the art. By way of example, a peak maximum may be found by determining when the direction of the signal changes. For example, for a signal X, at each point $\Delta x=X(t)-X(t-1)$ may be calculated, where $\Delta x$ may denote the direction of X, i.e., if $\Delta x \geq 0$, X is going in the up direction and otherwise X is going in the down direction, so that when $\Delta x$ changes from positive to negative, $X(t-1)$ may be considered a detected peak. Another manner of detecting peaks is to use the second order difference. For example, for a signal X, the first order difference $\Delta x$ may be calculated for each sampling point, Once $\Delta x \approx 0$, there is a local maximal point (peak) or a local minimal point (trough), By calculating a second order difference $\Delta\Delta x$, it can be determined whether the point is a minimal point (trough), i.e., when $\Delta\Delta x \geq 0$, or when the point is a local maximal point (peak), i.e., when $\Delta\Delta x<0$. Other methods of peak detection may be used, for example, a peak maximum may be found based on a first derivative of the signal with a downward-going zero-crossing with a slope that exceeds a predetermined minimum If desired, the peak maximum may only be at a point where the original signal exceeds a predetermined amplitude threshold, Fig, 3, by way of example, illustrates detected peaks on signals 300, 310, and 320 with an "x." Peaks from each signal may be detected in any desired fashion.

Intervals between the peaks for each axis are calculated (405) and an axis with a stable periodic signal is determined based on the intervals between peaks (406). Thus, on each axis, a time series of intervals is determined. For example, as illustrated in FIG. 3, the time series intervals on signal 300 on the X axis are denoted as $IX_0, IX_1, IX_2, IX_3, IX_4, \ldots$; the time series intervals on signal 310 on the Y axis are denoted as $IY_0, IY_1, IY_2, IY_3, IY_4, \ldots$; and the time series intervals on signal 320 on the Z axis are denoted as $IZ_0, IZ_1, IZ_2, IZ_3, IZ_4, \ldots$. A preset number of intervals are analyzed to determine stability of the period. As illustrated in FIG. 3, by way of example, for each axis, the most recent five intervals are analyzed using a moving window to determine stability. Of course, the preset number of intervals may be greater or lesser than five if desired. In one implementation, for each axis, a standard deviation for the most recent preset number of intervals may be determined and compared to a predetermined threshold T to determine if the axis is producing a stable periodic signal. If desired, other metrics may be used to determine stability. For example, stability can be determined in the frequency domain. In the frequency domain, the compactness of the frequency of the signal within a moving window is an implicit indication of stability. By way of illustration, in FIG. 3 the X axis is the first axis to produce the predetermined number, e.g., five, successive stable intervals. Accordingly, the X axis will serve as the counting axis, i.e., the axis used to count steps.

The stability of the period of signal 300 from the X axis may be continually monitored using a moving window, i.e., by analyzing the most recent preset number of intervals to determine if and when periodic signal from the X axis is no longer stable. For example, the standard deviation of the most recent preset number of intervals is continually updated and compared to the predetermined threshold T to determine if the axis continues to produce a stable periodic signal. If desired, once a stable axis is determined, a different, e.g., reduced, threshold may be used to determine if the axis continues to produce a stable periodic signal. Additionally, the remaining axes may be continually monitored to determine whether they produce a stable periodic signal.

As illustrated in FIG. 4, whether the axis with the stable periodic signal registers arm movement or footsteps is determined (408). Determining whether the counting axis registers arm movement of footsteps is performed so that one step per detected event is counted when the axis registers footsteps and two steps per detected event are counted when the axis registers arm movement (410).

The detected event may be either each peak on the signal or an interval between peaks on the signal. Whether the counting axis registers arm movement of footsteps may be determined, e.g., based on the period of the counting axis. There are two footsteps for a single period of arm movement. Accordingly, by comparing the period of the counting axis to, e.g., the period from other stable axes; it may be determined whether the counting axis is registering arm movement or footsteps. For example, in one implementation, the period between peaks from the counting axis may be determined and a minimal periodic time length may be determined based on a shortest period from any axis having a stable periodic signal. The period of the counting axis may be compared with a minimal periodic time length. If the counting axis has a period that is significantly greater than, e.g., approximately twice, the minimal periodic time length, then the counting axis is registering arm movement, and otherwise, the counting axis is registering footsteps.

As discussed above, the stability of the period of signal from the counting axis is continually monitored. The stability of the other axes may also be continually monitored. If the counting axis loses stability, e.g., the standard deviation of the most recent preset number of intervals fall below the predetermined threshold, a search for a different axis with a stable periodic signal is performed. For example, for each remaining axis, the standard deviation of the most recent preset number of intervals is determined and compared to the predetermined threshold T to determine if an axis is producing a stable periodic signal. If an axis is producing a stable periodic signal, that axis becomes the counting axis.

If desired, rather than detecting instability of the current counting axis before searching for a different counting axis, a different counting axis may be selected when a different axis is determined to be more stable than the current counting axis. For example, the stability of the current counting axis and a different axis may be determined and compared to each other, and if the stability of the different axis is greater, then the different axis may be selected as the counting axis. If desired, the stability of the different axis may be required to exceed the stability of the current counting axis by a predetermined threshold. As discussed above, the stability of the current counting axis and the different counting axis may be determined in any way desired, including calculating the standard deviation of the most recent preset number of intervals.

Whether the new counting axis with a stable periodic signal registers arm movement or footsteps is determined. One step per detected event from the new counting axis is counted when the new counting axis registers footsteps and two steps per detected event are counted when the new counting axis registers arm movement. Whether the new counting axis registers arm movement of footsteps may be determined, e.g., based on the period of the new counting axis. For example, the period of the new counting axis may be compared to, e.g., the period from previous counting axis.

Figure 5:
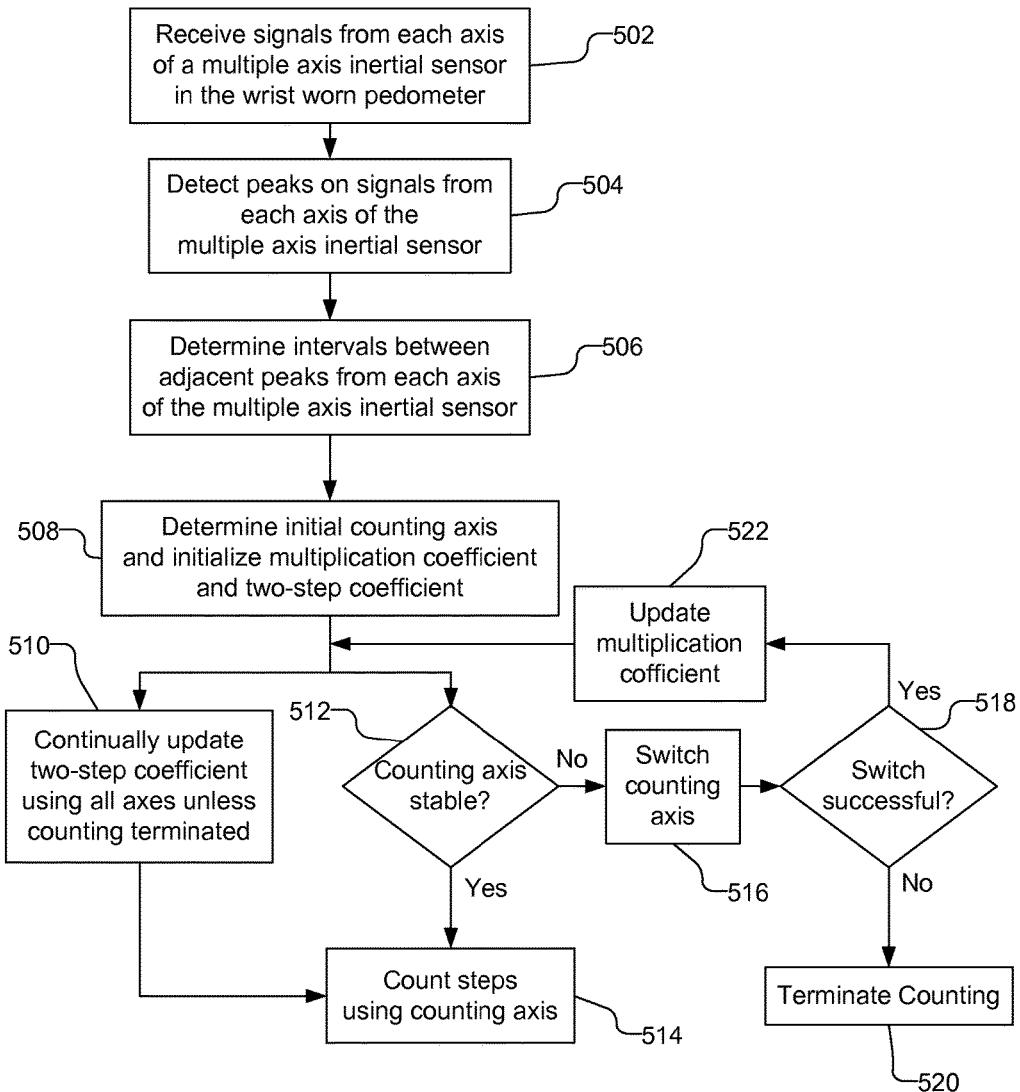
FIG. 5 is a flow chart illustrating another process of counting steps with a wrist worn pedometer that may be employed by pedometer.

FIG. 5 is a flow chart illustrating another process of counting steps with a wrist worn pedometer that may be employed by pedometer 100. The process of FIG. 5 is similar to the process illustrated in FIG. 4, but includes additional features that may be implemented if desired. As illustrated in FIG. 5, signals are received from each axis of a multiple axis inertial sensor in the wrist worn pedometer (502). The signals may be filtered, e.g., with a moving average filter, or any other desired filter to smooth the signals if desired. As discussed above, peaks are detected on the signals from each axis of the multiple axis inertial sensor (504) and intervals are determined between adjacent peaks from each axis of the multiple axis inertial sensor (506).

The initial counting axis is determined (508). For example, as discussed above, the initial counting axis may be determined as the first stable axis. For example, an axis may be determined to be stable by calculating the standard deviation for the most recent preset number of intervals and comparing the standard deviation to a predetermined threshold T. If the standard deviation is less than the threshold T, the axis has produced a preset number of successive stable intervals and is therefore considered stable. The time length of the period from the initial counting axis may be stored as the "initial periodic time length." The time length of the period from the initial counting axis may be the average or median period of the preset number of intervals. Thus, referring to FIG. 3, assuming the X axis is determined to be the first axis that is producing a stable periodic signal and is therefore determined to be the initial counting axis, the initial periodic time length is the average or median of intervals $IX_0$, $IX_1$, $IX_2$, $IX_3$, $IX_4$. Additionally, a "minimal periodic time length" may be initialized as initial periodic time length. The minimal periodic time length, however, is continually updated during the counting process. Accordingly, if at any time during the counting process, any axis produces the preset number of successive stable intervals and the average or median value of the preset number of intervals is smaller than the current minimal periodic time length, then the minimal periodic time length is updated. In general, the minimal periodic time length may be considered to be the time for one footstep.

Additionally, as illustrated in FIG. 5, a "multiplication coefficient" and a "two-step coefficient" are initialized (508) when the initial counting axis is determined. The multiplication coefficient is an enumerated variable that may be equal to 0.5 or 1 or 2. The multiplication coefficient denotes the multiplication relationship between the periodic time length from a current counting axis and the initial periodic time length. In other words, considering the initial periodic time length to be a unit, the multiplication coefficient denotes how many units (0.5 or 1 or 2) are represented by one detected event (i.e., one detected peak or an interval between peaks) on the current counting axis. Because the periodic time length of the initial counting axis defines the initial periodic time length, the multiplication coefficient is initialized to a value of 1. The multiplication coefficient is updated when the counting axis is switched.

The two-step coefficient is another enumerated variable that may be equal to 1 or 2. The two-step coefficient denotes how many steps (1 step or 2 steps) are represented by the initial periodic time length. Considering the initial periodic time length to be a unit, each detected event ((i.e., one detected peak or an interval between peaks) includes some number of units (denoted by the multiplication coefficient), and each unit represents either 1 step or 2 steps (denoted by the two-step coefficient), depending on whether the initial counting axis registers arm movement or footsteps. The two-step coefficient may be determined by comparing the period of the initial counting axis to the period from other stable axes or the minimal periodic time length. For example, in one implementation, the two-step coefficient may be determined as:

$$TwoStepCoefficient = \begin{cases} 2 & \text{if } \text{floor}\left(\frac{IPTL + 0.5}{MPTL}\right) \geq 2 \\ 1 & \text{otherwise} \end{cases} \quad \text{eq. 1}$$

where IPTL is the initial periodic time length and MPTL is the minimal periodic time length. The two-step coefficient is initialized as 1, but is continually updated using all axes, unless counting is terminated (510). For example, referring to equation 1, it can be seen that any time the minimal periodic time length is decreased, the two-step coefficient may be updated.

As illustrated in FIG. 5, if the counting axis is stable (512), e.g., the standard deviation of the most recent preset number of intervals is less than the predetermined threshold T as discussed above, the steps are counted using the counting axis (514) based on the continually updated two-step coefficient (510) and the multiplication coefficient. For example, the steps may be counted based on a detected event on the counting axis, which may be a detected peak or an interval between detected peaks on the counting axis. Each detected event may be multiplied by the product of the multiplication coefficient and the two-step coefficient to determine the steps. In addition, because the counting axis is not identified until a preset number of intervals have passed (and found to be stable), the number of detected events will be initialized as the present number of intervals. For example, if the counting axis is determined after five stable intervals, then the step count may start at five steps. If the two-step coefficient is updated from 1 to 2 for the current counting axis, the number of detected events is multiplied by 2. For example, before the two-step coefficient becomes 2 the number of reported steps is n based on n detected events, after the two-step coefficient becomes 2, when the n+1 event is detected, the total step count will increase to 2n+2 steps.

If the counting axis is no longer stable (512), the counting axis is switched (516) to one of the remaining axes of the inertial sensor. If none of the remaining axes is stable, the switch is not successful (518) and the counting is terminated (520). If counting is terminated (520), the process may start over at step 502 if desired. On the other hand, if the one of the remaining axes is stable, the switch is successful (518). Upon switching the counting axis, the multiplication coefficient is updated (522). The update to the multiplication coefficient is based on a comparison of the average or median period of the new counting axis to the initial periodic time length. For example, if the average period of the new counting axis is less than half the initial periodic time length, the multiplication coefficient is 0.5, and if the average period of the new counting axis is greater than twice the initial periodic time length, the multiplication coefficient is 2, and otherwise the multiplication coefficient is 1. For example, referring to FIG. 3, assuming the initial counting axis was the X axis, and after losing stability, the new counting axis is the Y axis, the average or median period of the new counting axis (denoted as $IY_{AVE}$) may be determined as the average or median of the preset number of successive stable intervals up to the current time C, e.g., $IY_{C-4}$, $IY_{C-6}$, $IY_{C-2}$, $IY_{C-1}$, $IY_C$. The multiplication coefficient may be selected as 0.5 or 1 or 2 as follows:

$$MultiplicationCoefficient = \begin{cases} 0.5 & \text{if } IY_{AVE} \leq 0.5 * IPTL \\ 2 & \text{if } IY_{AVE} \geq 2 * IPTL \\ 1 & \text{otherwise} \end{cases} \quad \text{eq. 2}$$

As long as the current counting axis remains stable (512), the steps are counted using the current counting axis (514) based on the continually updated two-step coefficient (510) and the updated multiplication coefficient (522).

A few examples are provided to illustrate the operation of the process of counting steps with a switch of the counting axis, as discussed above. In one example, the initial counting axis registers arm movement and the counting axis after the switch registers footsteps. In the present example, the initial counting axis is determined as the first axis to produce a stable periodic signal. The initial periodic time length is stored as the average period of the initial counting axis and the minimal periodic time length is initialized as initial periodic time length. The multiplication coefficient is initialized as 1 and the two-step coefficient is initialized as 1, but the two-step coefficient will be rapidly updated to 2 because the minimal periodic time length will quickly decrease when a stable periodic signal is detected on a non-counting axis that is registering footsteps. Thus, for the initial counting axis registering arm movement, each detected event, which may be a detected peak or an interval between the detected peaks, is multiplied by the product of the multiplication coefficient (1) and the two-step coefficient (2), i.e., 1*2=2, and, accordingly, 2 steps will be counted for each detected event. At some point, the counting axis is switched, e.g., because the initial counting axis is no longer stable, and there are stable intervals on a different counting axis, which becomes the new counting axis. In the current example, the new counting axis is registering footsteps, and accordingly, the average period for the new counting axis is approximately half of the initial periodic time length. Accordingly, when the counting axis is switched, the multiplication coefficient will be updated to 0.5. Thus, for the new counting axis registering footsteps, each detected event is multiplied by the product of the multiplication coefficient (0.5) and the two-step coefficient (1), i.e., 0.5*2=1, and, accordingly, 1 step will be counted for each detected event.

In another example, the initial counting axis registers footsteps and the counting axis after the switch registers arm movement. As in the above example, the initial counting axis is determined as the first axis to produce a stable periodic signal, and the initial periodic time length is stored as the average period of the initial counting axis and the minimal periodic time length is initialized as initial periodic time length. The multiplication coefficient is initialized as 1 and the two-step coefficient is initialized as 1. In the present example, the two-step coefficient will remain 1 for the initial counting axis because the minimal periodic time length will not decrease when a stable periodic signal is detected on a non-counting axis that is registering arm movement. Thus, for the initial counting axis registering footsteps, each detected event, which may be a detected peak or an interval between the detected peaks, is multiplied by the product of the multiplication coefficient (1) and the two-step coefficient (1), i.e., 1*1=1, and, accordingly, 1 step will be counted for each detected event. At some point, the counting axis is switched, e.g., because the initial counting axis is no longer stable, and there are stable intervals on a different counting axis, which becomes the new counting axis. In the current example, the new counting axis is registering arm movement, and accordingly, the average period for the new counting axis is approximately twice the initial periodic time length. Accordingly, when the counting axis is switched, the multiplication coefficient will be updated to 2. Thus, for the new counting axis registering arm movement, each detected event is multiplied by the product of the multiplication coefficient (2) and the two-step coefficient (1), i.e., 2*1=2, and, accordingly, 2 steps will be counted for each detected event.

In another example, the initial counting axis registers footsteps and the counting axis after the switch also registers footsteps, which may occur, e.g., if the user bends an elbow altering the orientation of the pedometer. As in the above example, the initial counting axis is determined as the first axis to produce a stable periodic signal, and the initial periodic time length is stored as the average period of the initial counting axis and the minimal periodic time length is initialized as initial periodic time length. The multiplication coefficient is initialized as 1 and the two-step coefficient is initialized as 1. In the present example, the two-step coefficient will remain 1 for the initial counting axis because the minimal periodic time length will not decrease when a stable periodic signal is detected on a non-counting axis that is registering arm movement. Thus, for the initial counting axis registering footsteps, each detected event, which may be a detected peak or an interval between the detected peaks, is multiplied by the product of the multiplication coefficient (1) and the two-step coefficient (1), i.e., 1*1=1, and, accordingly, 1 step will be counted for each detected event. At some point, the counting axis is switched, e.g., because the initial counting axis is no longer stable. and there are stable intervals on a different counting axis, which becomes the .new counting axis. In the current example, the new counting axis is also registering footsteps, and accordingly, the average period for the new counting axis is approximately same as the initial periodic time length. Accordingly, when the counting axis is switched, the multiplication coefficient will remain as 1. Thus, for the new counting axis registering footsteps, each detected event is multiplied by the product of the multiplication coefficient (1) and the two-step coefficient (1), i.e., 1*1=1, and, accordingly, 1 step will be counted for each detected event.

In another example, the initial counting axis registers arm movement and the counting axis after the switch also registers arm movement, which may occur, e.g, if the user bends an elbow alerting the orientation of the pedometer. As in the above example, the initial counting axis is determined as the first axis to produce a stable periodic signal, and the initial periodic time length is stored as the average period of the initial counting axis and. the minimal periodic time length is initialized as initial periodic time length. The multiplication coefficient is initialized as 1 and the two-step coefficient is initialized as 1, but the two-step coefficient will be rapidly updated to 2 because the minimal periodic time length will quickly decrease when a stable periodic signal is detected on a non-counting axis that is registering footsteps. Thus, for the initial counting axis registering arm movement, each detected event, which may be a detected peak or an interval between the detected peaks, is multiplied by the product of the multiplication coefficient (1) and the two-step coefficient (2), i.e., 1*2=2, and, accordingly, 2 steps will be counted for each detected event, At some point, the counting axis is switched, e.g., because the initial counting axis is no longer stable, and there are stable intervals on a different counting axis, which becomes the new counting axis. In the current example, the new counting axis is also registering arm movement, and accordingly, the average period for the new counting axis is approximately same as the initial periodic time length. Accordingly, when the counting axis is switched, the multiplication coefficient will remain as 1. Thus, for the new counting axis registering arm movement, each detected event is multiplied by the product of the multiplication coefficient (1) and the two-step coefficient (2), i.e., 1*2=2, and, accordingly, 2 steps will be counted for each detected event.

Figure 6:
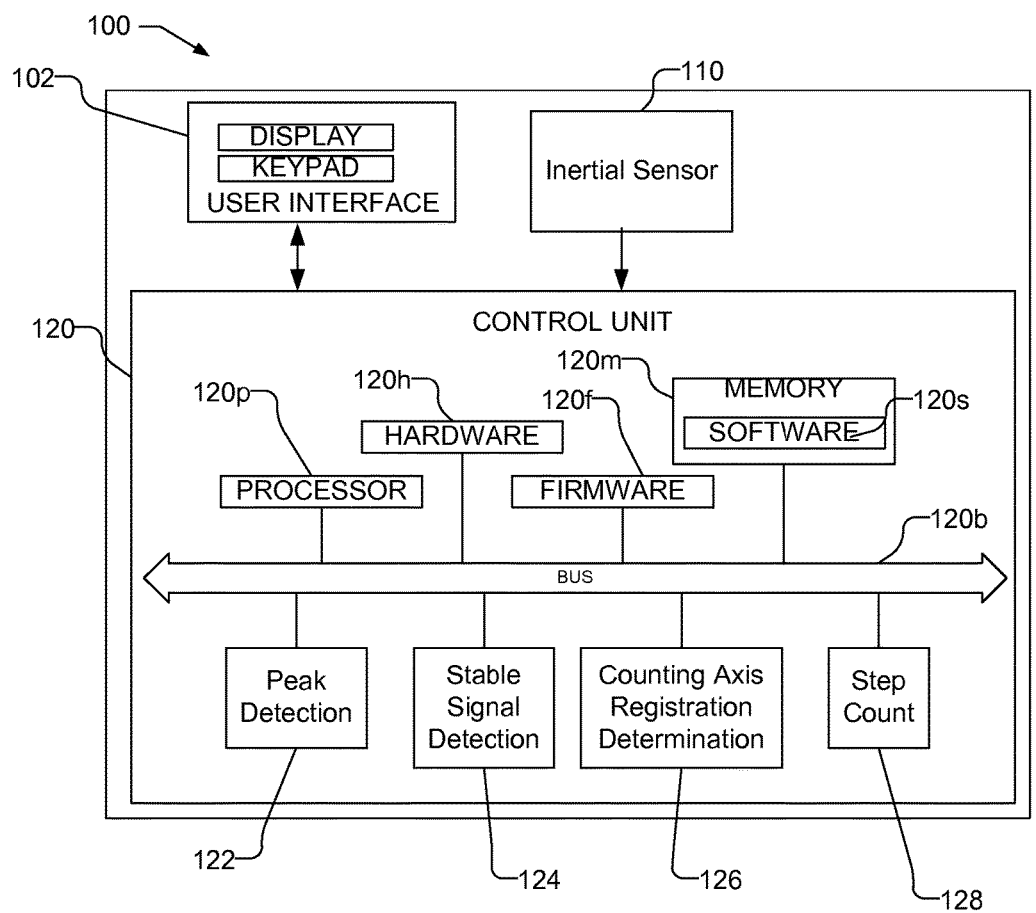
FIG. 6 is a block diagram of the pedometer, which is wrist worn by the user and includes a multiple axis inertial sensor and control unit.

FIG. 6 is a block diagram of the pedometer 100, which is wrist worn by the user and includes a multiple axis inertial sensor 110 as discussed herein. The pedometer 100 uses a signal axis of the inertial sensor 110 as a counting axis and determines whether the counting axis is registering arm movement or footsteps and counts one step per detected event if the counting axis is registering footsteps and two steps per detected event if the counting axis is registering arm movement. The multiple axis inertial sensor 110 may include two or three axes and may be, for example, a three axis accelerometer, gyroscopes, or the like. The pedometer 100 further includes a user interface 102 that may include, e.g., a display, as well as a real or virtual keys or other input device through which the user may, e.g., input information, make selections and reset the pedometer 100.

The pedometer 100 also includes a control unit 120 that is connected to receive signals from the inertial sensor 110 and to communicate with the user interface 102. The control unit 120 receives and processes the signals from the inertial sensor 110 as described herein, including selecting a counting axis and determining whether the counting axis is registering arm movement or footsteps and counting one step per detected event if the counting axis is registering footsteps and two steps per detected event if the counting axis is registering arm movement. The control unit 120 may be provided by a bus 120b, processor 120p and associated memory 120m, hardware 120h, firmware 120f, and software 120s. The control unit 120 is further illustrated as including a peak detection unit 122, which detects peaks on the signals from each axis of the multiple axis inertial sensor 110. A stable signal detection unit 124 detects stable periodic signals from the inertial sensor 110, e.g., by calculating intervals between the peaks for each axis and determining when a signal produces a predetermined number of successive stable intervals. The stable signal detection unit 124 identifies, and thus, selects the counting axes and determines when a counting axis is no longer stable and therefore a switch is required. A counting axis registration determination unit 126 determines whether the current counting axis is registering arm movement or footsteps. For example, the counting axis registration determination unit 126 may initialize and update the multiplication coefficient and two-step coefficient, which may be stored in memory 120m. The step count unit 128 detects events on the counting axis, which may be detected peaks or the intervals between peaks, and counts one step per detected event when the counting axis registers footsteps and two steps per detected event when the counting axis registers arm movement, e.g., by multiplying each event with the product of the multiplication coefficient and two-step coefficient. The control unit 120 may then cause the display of the user interface 102 to display the number of steps, as well as any other related information, which may be determined from the number of steps, such as distance traveled, calories burned, etc.

It should be understood that the peak detection unit 122, the stable signal detection unit 124, the counting axis registration determination unit 126, and the step count unit 128 are illustrated separately from processor 120p for clarity, but may be part of the processor 120p or implemented in the processor based on instructions in the software 120s which is run in the processor 120p. It will be understood as used herein that the processor 120p may, but need not necessarily include, one or more microprocessors, embedded processors, controllers, application specific integrated circuits (ASICs), digital signal processing devices (DSPDs), programmable logic devices (PLDs), field programmable gate arrays (FPGAs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 120h, firmware 120f, software 120s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 120m and executed by the processor 120p. Memory 120m may be implemented within or external to the processor 120p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical, i.e., non-transitory, computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 7:
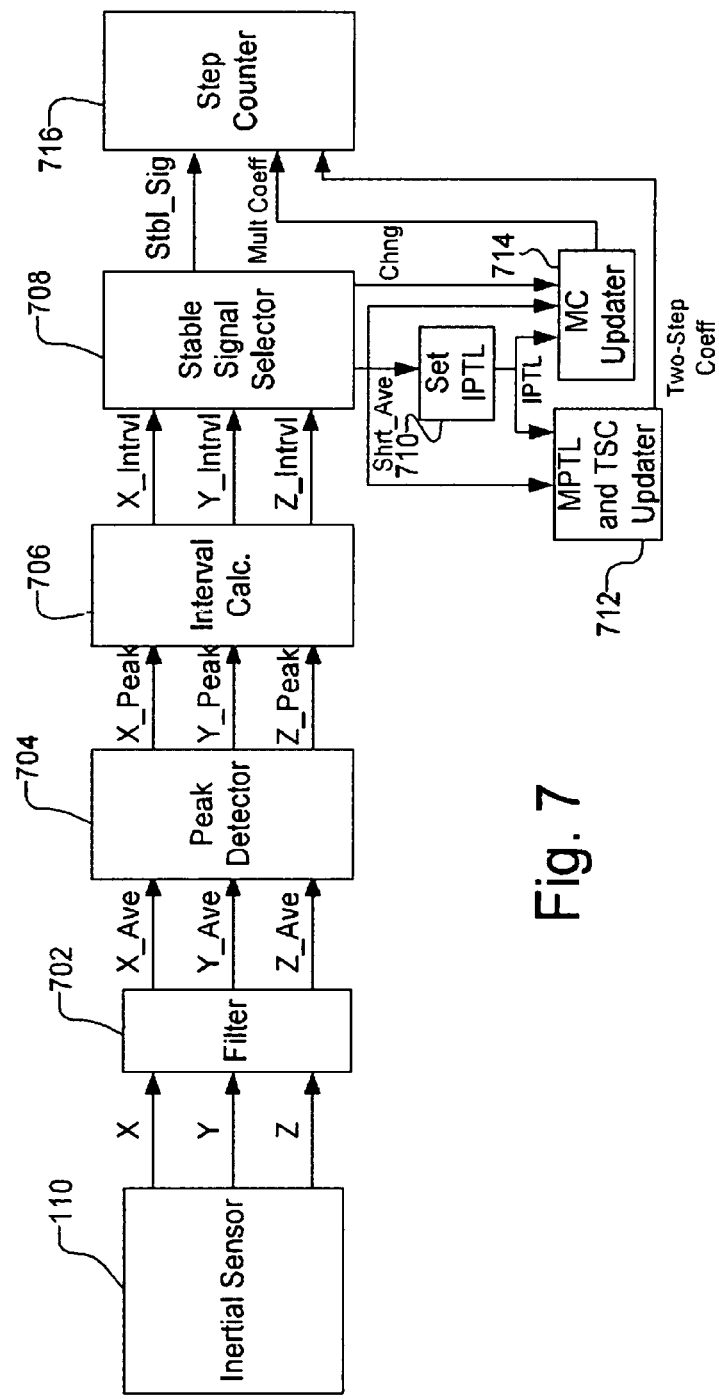
FIG. 7 schematically illustrates components of the control unit of the pedometer used to implement the methodologies described herein.

FIG. 7, by way of example, schematically illustrates components of the control unit 120 used to implement the methodologies described herein. Other than the inertial sensors 110, the components shown in FIG. 7 may be implanted in hardware within the processor 120p, e.g., such as components or modules of an FPGA, or may be implemented in separate hardware component including in multiple components. Further, the components may be implemented in software that is executed by one or more processors, including the processor 120p. Alternatively, the components may be implemented in a combination of hardware or software components.

FIG. 7, by way of example, illustrates a multiple axis inertial sensor 110 providing signals from each axis identified as X, Y, and Z and which are received by a filter 702. The filter 702 may be a moving average filter, or any other desired filter to smooth the signals, which may be implemented in hardware, e.g., before the signals are received by the processor 120p (FIG. 6) or by the processor 120p. Alternatively, the filter 702 may be implemented in software that is executed by the processor 120p. The filter 702 produces a moving average of the signals from each axis, identified as X_Ave, Y_Ave, and Z_Ave, which are received by the peak detector 704.

The peak detector 704, by way of example, may determine a first derivative of the signal on each axis and determine when a downward-going zero-crossing has a slope that exceeds a predetermined minimum and the original signal exceeds a predetermined amplitude threshold to detect a peak. The peak detector 704 produces the identified peaks on each signal, identified as X_Peak, Y_Peak, and Z_Peak, to an interval calculator 706. The interval calculator 706 calculates the length of each interval between consecutive peaks on each axis and produces the interval signals, identified as X_Intrvl, Y_Intrvl, and Z_Intrvl to the stable signal selector 708.

The stable signal selector 708 analyzes the signals X_Intrvl, Y_Intrvl, and Z_Intrvl to determine the stability of the intervals over a preset number of intervals. For example, the stable signal selector 708 may determine a standard deviation for the most recent preset number, e.g., 5, of intervals for each signal. To determine the standard deviation for each axis, the stable signal selector 708 may generate an average of the length of the preset number of intervals, determine a squared difference between the average length and the length of each interval (e.g., determine the average length and the length of each interval and square the result, and then average the squared differences. The stable signal selector 708 may then compare the standard deviation to a predetermined threshold T to determine if the intervals are stable. The first axis to be determined to have a stable periodic signal is selected as the counting axis and the signal is produced by the stable signal selector 708, identified as Stbl_Sig. The stable signal selector 708 continues to analyze the signals X_Intrvl, Y_Intrvl, and Z_Intrvl to determine when the selected counting axis is no longer providing a stable signal and to find another axis that is providing a stable signal. The stable signal selector 708 produces an indication that the counting axis is changing, identified as Chng. Additionally, the stable signal selector 708 determines and produces the shortest average length for the most recent preset number of intervals out of all of the axes, identified as Shrt_Ave.

As can be seen, the shortest average length of intervals (Shrt_Ave) is received by set IPTL 710 (initial periodic time length), which stores the first received shortest average length of intervals (Shrt_Ave), which is for the initial counting axis, in memory as the initial periodic time length. The initial periodic time length is not updated unless counting is terminated (e.g., switching of axis fails) and the counting is re-initiated. The set IPTL 710 produces the value of the initial periodic time length, identified as IPTL.

The shortest average length of intervals (Shrt_Ave) is also received by the MPTL (minimal periodic time length) and TSC (two-step coefficient) updater 712, which also receives the IPTL signal from Set IPTL 710. The MPTL and TSC updater 712 continually updates the minimal periodic time length whenever the shortest average length of intervals Shrt_Ave decreases. Additionally, the MPTL and TSC updater 712 updates the two-step coefficient using the minimal periodic time length and the initial periodic time length, e.g., as per equation 1, whenever the minimal periodic time length is decreased. The MPTL and TSC updater 712 produces the two-step coefficient, labeled two-step coeff.

The shortest average length of intervals (Shrt_Ave) is also received by the MC (multiplication coefficient) updater 714, which also receives the IPTL signal from Set IPTL 710 and the change signal, Chng from the stable signal selector 708. The MC updater 714 updates the multiplication coefficient when there is a change in the counting axis, as indicated by Chng, using the shortest average length of intervals (Shrt_Ave), which will be the average length of the newly selected counting axis, and the initial periodic time length, e.g., as per equation 2. The MC updater 714 produces the multiplication coefficient, labeled Mult Coeff.

The step counter 716 counts each interval provided on Stbl_Sig, and multiplies each count with the product of the two-step coefficient and the multiplication coefficient. If desired, the step counter 716 may count detected peaks, rather than intervals, e.g., if the signals with peaks from peak detector 704 is provided to step counter 716.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method for counting steps with a wrist worn pedometer, the method comprising:
receiving signals from each axis of a multiple axes inertial sensor in the wrist worn pedometer;
detecting peaks on each signal from each axis of the multiple axes inertial sensor;
calculating intervals between the detected peaks on each signal from each axis of the multiple axes inertial sensor;
determining a stability of the intervals between the detected peaks;
selecting a first axis with a stable periodic signal based on the stability of the intervals between the detected peaks;
counting steps based on detected events in the stable periodic signal for a predetermined number of detected events:
determining whether the first axis with the stable periodic signal registers arm movement or footsteps after the predetermined number of detected events:
revising a step count based on whether the first axis with the stable periodic signal registers arm movement or footsteps;
continuing to count steps based on additional detected events in the stable periodic signal, wherein one step per a detected event in the stable periodic signal is counted when the first axis with the stable periodic signal registers footsteps or two steps per the detected event are counted when the first axis with the stable periodic signal registers arm movement, and
displaying the step count on a display of the wrist worn pedometer.

2. The method of claim 1, wherein determining the stability of the intervals between the detected peaks comprises:
determining a standard deviation for a preset number of intervals between the detected peaks on each signal from each axis; and
comparing the standard deviation from each axis to a predetermined threshold to determine the first axis with the stable periodic signal.

3. The method of claim 1, wherein determining whether the first axis with the stable periodic signal registers arm movement or footsteps comprises:
determining an average or mean period between the detected peaks on the first axis;
determining a minimal periodic time length based on a shortest period from any axis having a stable periodic signal;
comparing the average or mean period between the detected peaks on the first axis with the minimal periodic time length, wherein the first axis is determined to register arm movement if the period between the detected peaks on the first axis is at least twice the minimal periodic time length.

4. The method of claim 1, wherein the detected events in the stable periodic signal are the detected peaks or the intervals between the detected peaks.

5. The method of claim 1, further comprising:
selecting a second axis with a stable periodic signal;
determining whether the second axis with the stable periodic signal registers arm movement or footsteps; and
wherein one step per the detected event in the stable periodic signal from the second axis is counted when the second axis with the stable periodic signal registers footsteps or two steps per the detected event in the stable periodic signal from the second axis are counted when the second axis with the stable periodic signal registers arm movement.

6. The method of claim 5, wherein selecting the second axis with the stable periodic signal comprises determining that the intervals between the detected peaks on a signal from the first axis are no longer stable before selecting the second axis with the stable periodic signal.

7. The method of claim 5, wherein selecting the second axis with the stable periodic signal comprises:
determining a stability of intervals between detected peaks on a signal from the first axis;
determining a stability of intervals between detected peaks on a signal from the second axis; and
determining that the stability of the intervals between the detected peaks on the signal from the second axis is greater than the stability of the intervals between the detected peaks on the signal from the first axis.

8. The method of claim 5, wherein determining whether the second axis with the stable periodic signal registers arm movement or footsteps comprises:
determining an average or mean period between the detected peaks on the second axis;
determining a minimal periodic time length based on a shortest period from any axis having a stable periodic signal;
comparing the average or mean period between the detected peaks on the second axis with the minimal periodic time length, wherein the second axis is determined to register arm movement if the period between the detected peaks on the second axis is at least twice the minimal periodic time length.

9. The method of claim 8, wherein when the first axis is determined to register arm movement, a two-step coefficient is set to a value of 2 or is otherwise set to a value of 1, and wherein determining whether the second axis with the stable periodic signal registers arm movement or footsteps further comprises:
setting an initial periodic time length as an average or mean period between the detected peaks on the first axis when the first axis is determined to produce a stable periodic signal;
comparing the average or mean period between the detected peaks on the second axis with the initial periodic time length, wherein a multiplication coefficient is set to 0.5 if the average or mean period between the detected peaks on the second axis is less than half of the initial periodic time length, the multiplication coefficient is set to 2 if the average or mean period between the detected peaks on the second axis is more than twice the initial periodic time length, or the multiplication coefficient is set to 1 otherwise; and wherein one step per the detected event in the stable periodic signal from the second axis is counted when the second axis with the stable periodic signal registers footsteps or two steps per the detected event in the stable periodic signal from the second axis are counted when the second axis with the stable periodic signal registers arm movement by multiplying each detected event with a product of the two-step coefficient and the multiplication coefficient.

10. A pedometer for counting steps that is wrist worn, the pedometer comprising:
a multiple axes inertial sensor that provides signals for each axis;
a display for visually displaying a step count to a user of the pedometer, and
a processor coupled to the multiple axes inertial sensor and the display, the processor receives the signals from each axis of the multiple axes inertial sensor in the pedometer, the processor configured to detect peaks on each signal from each axis of the multiple axes inertial sensor; calculate intervals between the detected peaks on each signal from each axis of the multiple axes inertial sensor; determine a stability of the intervals between the detected peaks; select a first axis with a stable periodic signal based on the stability of the intervals between the detected peaks; count steps based on detected events in the stable periodic signal for a predetermined number of detected events; determine whether the first axis with the stable periodic signal registers arm movement or footsteps after the predetermined number of detected events: revise the step count based on whether the first axis with the stable periodic signal registers arm movement or footsteps; continue to count steps based on additional detected events in the stable periodic signal, wherein one step per a detected event in the stable periodic signal is counted when the first axis with the stable periodic signal registers footsteps or two steps per the detected event are counted when the first axis with the stable periodic signal registers arm movement; and cause the display to display the step count.

11. The pedometer of claim 10, wherein the processor is configured to determine the stability of the intervals between the detected peaks by being configured to determine a standard deviation for a preset number of intervals between the detected peaks on each signal from each axis; and compare the standard deviation from each axis to a predetermined threshold to determine the first axis with the stable periodic signal.

12. The pedometer of claim 10, wherein the processor is configured to determine whether the first axis with the stable periodic signal registers arm movement or footsteps by being configured to:
determine an average or mean period between the detected peaks on the first axis;
determine a minimal periodic time length based on a shortest period from any axis having a stable periodic signal;
compare the average or mean period between the detected peaks on the first axis with the minimal periodic time length, wherein the first axis is determined to register arm movement if the period between the detected peaks on the first axis is at least twice the minimal periodic time length.

13. The pedometer of claim 10, wherein the detected events in the stable periodic signal are the detected peaks or the intervals between the detected peaks.

14. The pedometer of claim 10, wherein the processor is further configured to select a second axis with a stable periodic signal; determine whether the second axis with the stable periodic signal registers arm movement or footsteps; and
wherein one step per the detected event in the stable periodic signal from the second axis is counted when the second axis with the stable periodic signal registers footsteps or two steps per the detected event in the stable periodic signal from the second axis are counted when the second axis with the stable periodic signal registers arm movement.

15. The pedometer of claim 14, wherein the processor is further configured to determine that the intervals between the detected peaks on a signal from the first axis are no longer stable before selecting the second axis with the stable periodic signal.

16. The pedometer of claim 14, wherein the processor is configured to select the second axis with the stable periodic signal by being configured to:
determine a stability of intervals between detected peaks on a signal from the first axis;
determine a stability of intervals between detected peaks on a signal from the second axis; and
determine that the stability of the intervals between the detected peaks on the signal from the second axis is greater than the stability of the intervals between the detected peaks on the signal from the first axis.

17. The pedometer of claim 14, wherein the processor is configured to determine whether the second axis with the stable periodic signal registers arm movement or footsteps by being configured to:
determine an average or mean period between the detected peaks on the second axis;
determine a minimal periodic time length based on a shortest period from any axis having a stable periodic signal;
compare the average or mean period between the detected peaks on the second axis with the minimal periodic time length, wherein the second axis is determined to register arm movement if the period between the detected peaks on the second axis is at least twice the minimal periodic time length.

18. The pedometer of claim 17, wherein the processor is configured to set a two-step coefficient to a value of 2 when the first axis is determined to register arm movement or to otherwise set the two-step coefficient to a value of 1, and wherein the processor is configured to determine whether the second axis with the stable periodic signal registers arm movement or footsteps by being further configured to:
set an initial periodic time length as an average or mean period between the detected peaks on the first axis when the first axis is determined to produce a stable periodic signal;
compare the average or mean period between the detected peaks on the second axis with the initial periodic time length, wherein the processor sets a multiplication coefficient to a value of 0.5 if the average or mean period between the detected peaks on the second axis is less than half of the initial periodic time length, the processor sets the multiplication coefficient to a value of 2 if the average or mean period between the detected peaks on the second axis is more than twice the initial periodic time length, or the processor sets the multiplication coefficient to a value of 1 otherwise; and
wherein one step per the detected event in the stable periodic signal from the second axis is counted when the second axis with the stable periodic signal registers footsteps or two steps per the detected event in the stable periodic signal from the second axis are counted when the second axis with the stable periodic signal registers arm movement by the processor being configured to multiply each detected event with a product of the two-step coefficient and the multiplication coefficient.

* * * * *